United States Patent [19]

Kalail, Sr. et al.

[11] Patent Number: 5,345,902
[45] Date of Patent: Sep. 13, 1994

[54] DEVICE FOR CONTROLLING THE FLOW OF FUEL TO AN ENGINE AND METHOD THEREOF

[75] Inventors: Frederick R. Kalail, Sr.; Harry M. Lapidakis, both of Akron, Ohio

[73] Assignee: Fuelproof Systems, Inc., Akron, Ohio

[21] Appl. No.: 962,263

[22] Filed: Oct. 16, 1992

[51] Int. Cl.⁵ .............................................. F02B 77/00
[52] U.S. Cl. .............................. 123/198 B; 123/179.2; 340/426
[58] Field of Search ......... 123/198 B, 198 DB, 179.2; 340/426; 364/431.03, 431.04

[56] References Cited

U.S. PATENT DOCUMENTS

| | | | |
|---|---|---|---|
| 4,067,411 | 1/1978 | Conky et al. | 340/426 |
| 4,141,332 | 2/1979 | Wyler | 123/198 B |
| 4,236,594 | 12/1980 | Ramsperger | 123/179.2 |
| 4,884,055 | 11/1989 | Memmola | 340/426 |
| 4,884,207 | 11/1989 | Asada et al. | 123/198 B |
| 5,000,139 | 3/1991 | Wong | 123/179.2 |
| 5,054,569 | 10/1991 | Scott et al. | 123/179.2 |

Primary Examiner—Noah P. Kamen
Attorney, Agent, or Firm—Reese Taylor

[57] ABSTRACT

A device is provided as part of a fuel cut-off system which includes a switch for selectively opening and closing the flow of fuel to an engine. Verification actuation information is received from an external source and compared with stored, predetermined actuation information and, provided there is a correspondence between the received and stored actuation information, selectively actuates the switch to shut off or open the flow of fuel to an engine. Moreover, the device may have the ability to cut off the flow of fuel at any time as controlled from an external source. The device may further include a clock to identify when the flow of fuel is to be shut off.

6 Claims, 1 Drawing Sheet

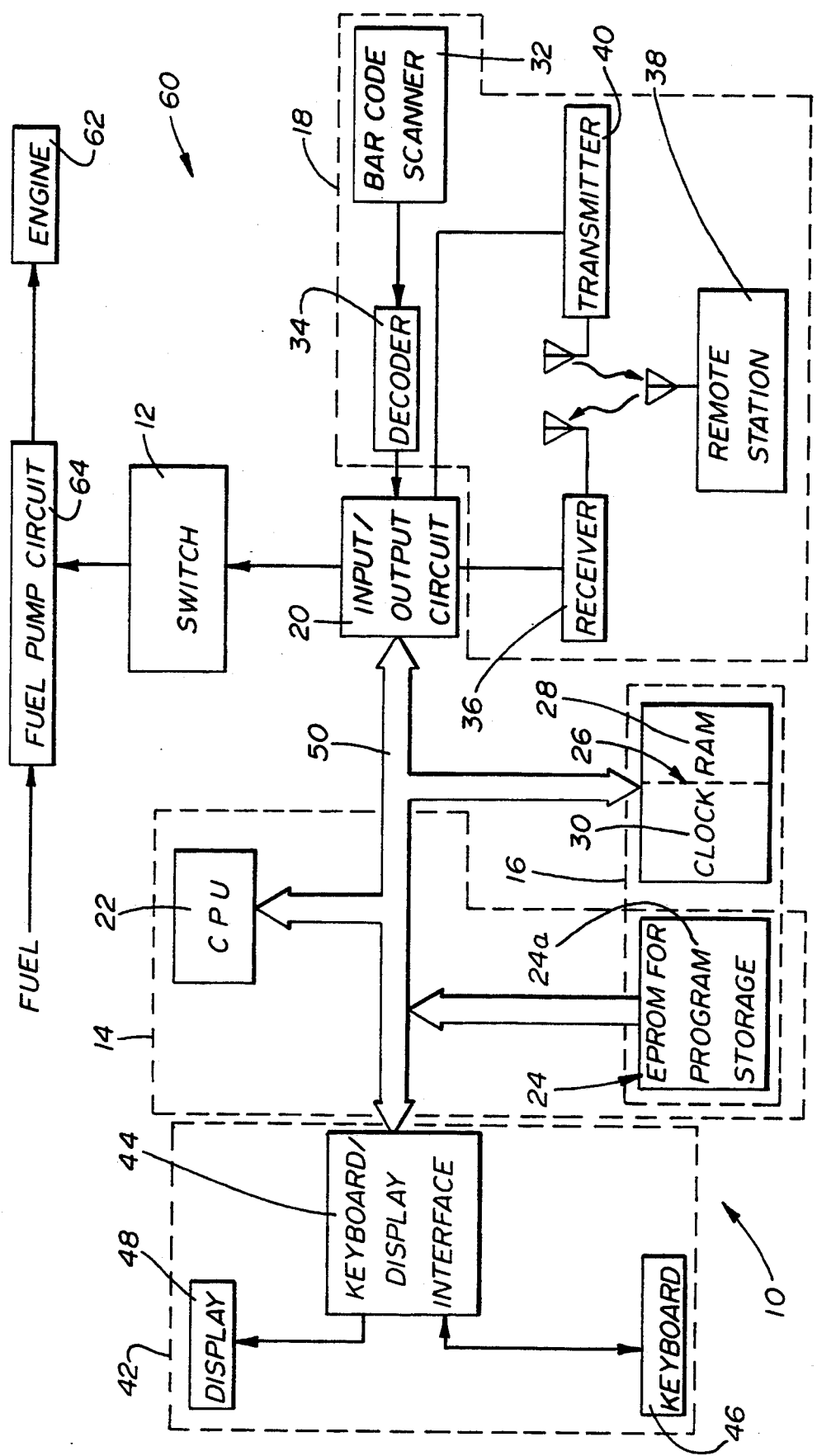

DEVICE FOR CONTROLLING THE FLOW OF FUEL TO AN ENGINE AND METHOD THEREOF

BACKGROUND OF THE INVENTION

This invention relates in general to a device for controlling the flow of fuel to an engine so as to prevent its operation. More particularly, this invention relates to a device which imparts information to the host computer of a vehicle which, in turn, shuts off or opens the fuel or ignition circuit of the vehicle, thereby cutting off or permitting the flow of fuel to the engine. The device can be selectively actuated and may be effective as a device to prevent auto theft, i.e., an anti-theft device, or as a device for limiting or restricting use of the vehicle into which it is installed.

DESCRIPTION OF THE PRIOR ART

Hundreds of vehicles are stolen or used illegally every day, costing insurance companies and vehicle owners millions of dollars every year. Devices which prevent such thefts and illegal uses of vehicles are in great demand from insurance companies and local, state and federal law enforcement agencies as well as vehicle owners.

To date, few devices have successfully prevented such thefts and illegal uses. Those which have been successful are found to be generally too expensive or complicated to implement, too time-consuming to operate effectively, or have other major limitations which prevent them from becoming popular and usable everywhere. For example, one widely publicized device is THE CLUB®, a locking bar made from reinforced steel which can be placed on the steering wheel of a vehicle to prevent anyone from operating the vehicle by prohibiting anyone from steering the vehicle. THE CLUB® is a registered trademark of James E. Winner of Sharon, Pa.

While this device has been successful in preventing some thefts and illegal uses of the vehicle, it can be easily defeated simply by cutting the bar or the steering wheel and removing the device therefrom. There are other disadvantages as well. For instance, it takes time to place the bar in position on the steering wheel and to remove it properly therefrom. While this may be advantageous in preventing a thief which does not have a cutting tool from quickly removing the bar, the inconvenience associated with its use by the owner/operator of the vehicle is a disadvantage. Moreover, such a device prevents everyone, including those who may rightfully operate the vehicle, from doing so until the bar is removed.

In addition, the use of such devices is limited to purposes which discourage operation or theft of the vehicle. In some cases, it may be practical to let a person drive at certain times of the day and to prevent him or her from driving at other times. For instance, a person suspected of using a company vehicle for non-work related activities could not be stopped by such a device.

Another device which has been employed, in at least the state of California, is a breath analysis device which prevents a vehicle from starting unless the blood-alcohol level of the driver is less than a predetermined amount. In order to start the vehicle, the driver must breathe into a tube leading to the device which then determines the amount of alcohol in the driver's system. If the amount is over the predetermined limit, the vehicle will not start; a situation possibly caused by shutting down the ignition circuit of the vehicle.

This device is not used as an auto theft prevention device and only precludes those having blood-alcohol levels over the predetermined limit from using the vehicle. Moreover, this device prevents the use of the vehicle based upon the results of a breath-analysis test, rather than at predetermined times. Inasmuch as there are other reasons besides alcohol-related incidents which make it desirable to prevent one from driving a vehicle, this device does not meet all the needs of law enforcement agencies or insurance companies or the like.

It would be advantageous to law enforcement agencies, insurance companies, and vehicle owners to know when a particular vehicle can be operated. Law enforcement agencies could then direct their resources to other activities without having to worry about the unauthorized use or theft of vehicles. Moreover, insurance companies could offer lower insurance rates if they were certain that a vehicle could only be operated at specified times and/or by specific persons. Vehicle owners, especially those who permit others to drive their vehicles, would also be benefitted because they would not have to worry about non-work related use of their vehicles.

Thus, while the various prior art just discussed is presumably adequate for the purposes for which they were designed, none of the art appears to provide for a device which will prevent the operation of a vehicle when required, but which will conveniently permit the driver of the vehicle to operate it when appropriate, without being subject to a blood-alcohol test or having to remove a bar from the steering wheel of the vehicle, etc. Furthermore, none of the art appears to cut off the flow of fuel to the engine at predetermined times so as to prevent the engine from starting. Therefore, the need exists for a device which can be selectively actuated to cut off the flow of fuel to the engine of a vehicle.

SUMMARY OF THE INVENTION

It is, therefore, an object of the present invention to provide a device which will prevent the operation of a vehicle at selected times.

It is another object of the present invention to provide a device, as above, which may be selectively actuated.

It is yet another object of the present invention to provide a device, as above, which can cut off the flow of fuel to an engine as required.

It is still another object of the present invention to provide a device, as above, which can prevent the theft of the vehicle into which it is installed.

It is a further object of the present invention to provide a device, as above, which will assure employers, law enforcement agencies, and insurance companies that the vehicles into which the device is installed will only be used by specific persons and/or for certain periods of time.

It has been found that these and other objects can be achieved by providing a device including switch means for selectively opening and closing the flow of fuel to an engine, means for storing predetermined actuation information, means for receiving verification actuation information, and processor means for comparing the predetermined actuation information and the verification actuation information and selectively actuating the switch means upon correspondence therebetween.

Accordingly, production of a device of the type described hereinabove becomes the principal object of the invention with other objects thereof becoming more apparent upon a reading of the following brief specification considered and interpreted in view of the accompanying drawings.

BRIEF DESCRIPTION OF THE DRAWINGS

The Figure is a block diagram showing an exemplary device of the present invention in communication with the fuel pump circuit of a vehicle.

BRIEF DESCRIPTION OF THE PREFERRED EMBODIMENTS

An exemplary device in accordance with the concepts of the present invention is shown in block diagram form in the Figure and is generally indicated by the numeral 10. Device 10 is particularly useful in controlling the flow of fuel to an engine and generally includes a switch 12, a processor 14, a storage memory/counter 16 and an information receptor 18.

Switch 12 may be an integral part of device 10 or may be operatively connected thereto. Switch 12 may communicate with the rest of device 10 by any means known in the art, but preferably is attached to device 10 by wires (not shown) extending to an input/output circuit 20 of device 10. Notably, switch 12 may be part of a host computer installed in a vehicle prior to or separate from the installation of device 10. For instance, switch 12 may be a fuel circuit, within the host computer, which regulates the flow of fuel to an engine. As an example, many General Motors manuals refer to "Circuit 120" as the fuel circuit in many General Motors automobiles. This circuit regulates the flow of fuel through the fuel pump circuit of the vehicle.

Processor 14 generally directs the operation of device 10 as detailed hereinbelow. It includes a central processing unit (CPU) 22 and a program 24a for carrying out the operations of device 10. CPU 22 may be any conventional processing unit such as a Model 8085A available from Intel Corporation of Dallas, Tex. Program 24a may be stored in an erasable, programmable ROM (EPROM) 24 such as a Model 8755A also available from Intel Corporation and which is compatible with CPU 22. It is to be understood that any CPU which can carry out the functions of program 24a is adequate for the present invention.

Storage memory/counter 16 is operatively connected to processor 14 and certain of the other components of device 10 such as by data bus 50. As shown in the Figure, storage memory/counter 16 may include EPROM 24. Any information stored in EPROM 24, such as vehicle identification information, is utilized by program 24a. Any other information, such as information relating to the time for actuation of switch 12, may be stored in a combination RAM/timer integrated circuit 26 which includes a volatile memory (RAM) portion 28 and a clock 30. Preferably, a RAM/timer integrated circuit, such as an 8156 available from Intel Corporation of Dallas, Tex. and compatible with the preferred processor 14, is employed, although any conventional timing mechanism which can determine the current time and is compatible with the other components of device 10 may be used. RAM portion 28 is used for storing information which may vary or change depending upon the application for which device 10 is used. Clock 30 serves as the timing mechanism for device 10 so as to permit device 10 to determine instantaneous time.

Information receptor 18 is operatively connected to device 10 through a serial port in input/output circuit 20 and generally receives information relating to the actuation of device 10 from an external source, such as a remote station 38. As shown in the Figure, there are at least two mechanisms which may receive the information. It is to be understood that device 10 may employ either mechanism or both mechanisms, depending on the application for which device 10 will be used. Other conventional receiver mechanisms may also be used, provided they perform the functions as set forth herein. For convenience, the Figure depicts both mechanisms.

First, information receptor 18 may be a bar code scanner or reader 32 which scans or reads a code printed, magnetically or otherwise, on a card or like article. Such an auto identification device as bar code scanner 32 is preferably mounted on the dashboard of the vehicle in which it is to be utilized. Any common auto identification device, such as bar code scanner 32, may be employed.

When such a bar code scanner as 32 is used, a compatible decoder 34 typically is employed. Decoder 34 is added to device 10 to interpret the information received from the bar code. In addition, it is to be understood that any type of bar code may be utilized with device 10, "bar code 39" being employed for the preferred bar code scanner and decoder.

Additionally, or alternatively, information receptor 18 may include a receiver 36 for receiving microwave transmissions from an external source such as remote station 38. As is known in the art, receiver 36 can receive transmissions directly from remote station 38, or indirectly, such as via satellite. Thus, it is not necessary that remote station 38 be in the vicinity of the vehicle in which device 10 is installed.

Device 10 may further include a transmitter 40 which operates through input/output circuit 20. Transmitter 40 may communicate with an external source such as remote station 38 in a manner similar to receiver 36. That is, transmitter 40 may send a signal by microwave transmissions either directly to remote station 38, or indirectly, as via satellite. This permits device 10 to send any information to remote station 38 without the vehicle being in the vicinity of the remote station.

A keyboard/display unit 42 may be further included as part of device 10. It is operatively connected to processor 14 and storage memory/counter 16 by data bus 50 or other conventional connectors. More specifically, the keyboard/display interface 44 is operatively connected to device 10. Keyboard/display interface 44 has a keyboard 46 for in-the-field testing and data input as may be required by program 24a. Display 48 is operatively connected to keyboard/display interface 44 to provide visual interpretation of the information.

It will be appreciated that, while device 10 comprises the basic ideas of the invention, a fuel cut-off system generally indicated by the numeral 60 is also envisioned. Such a system would include a switch for cutting off the flow of fuel to engine 62 at fuel pump circuit 64 as well as device 10. Thus, while device 10 is more particularly discussed herein, it should be understood that the invention is not limited thereto, the invention also extending to the novelty of fuel cut-off system 60.

Operation of device 10 is begun at installation. Each device 10 includes unique vehicle identification information stored in program 24a. That is, each device 10 has its own identification code. Information corresponding to this vehicle identification information is provided to the vehicle owner, law enforcement agencies, insurance companies, or any other entity which is to receive this information. Additional start-up information may be entered into device 10 by way of data input from keyboard/display unit 42. Thus, each device 10 includes predetermined actuation information which, when found to correspond with other actuation information, i.e., verification actuation information, as detailed hereinbelow, permits the selective actuation of switch 12.

In operation then, information receptor 18 receives information for the actuation of switch 12 from an external source such as a card having a magnetic strip or bar code, or a remote station as at 38. This information is regarded as verification actuation information. Processor 14 compares the verification actuation information with the predetermined actuation information stored in storage memory/counter 16. Upon identifying a correspondence between the verification and predetermined actuation information, processor 14 selectively actuates switch 12 by generating a signal from input/output circuit 20 to switch 12 to indicate that it may open or close off the flow of fuel to an engine 62. In the preferred embodiment and as shown in the Figure, the flow of fuel is regulated at a fuel pump circuit 64 within the fuel line of the vehicle in which device 10 is installed.

Preferably, a signal is transmitted through input/output circuit 20 to switch 12 which, in turn, may be selectively actuated. Desirably, switch 12 will not be actuated to cut off the flow of fuel to engine 62 unless the vehicle is turned off. At the least, it is preferred that switch 12 not cut off the flow of fuel to engine 62 until a sensor (not shown) has indicated that the vehicle is not moving. It will be appreciated that such a delay in actuation of the cut-off may be necessary to prevent accidents, although such a delay is not required by the present invention.

Furthermore, it should be understood that device 10 needs only vehicle identification information to operate, other forms of actuation information being pertinent typically for applications relating to a time when device 10 should selectively actuate switch 12. When more than the mere vehicle identification information is used in device 10, it is generally desirable to have processor 14 perform its operation of identifying a correspondence between the information relating to vehicle identification before it identifies a correspondence between the current time and the time for actuation. That is, once processor 14 has identified a correspondence between the predetermined and the received vehicle identification information, it may then perform its operation to identify a correspondence between the instantaneous or current time and the received actuation time, thereby preventing a mistake as to which vehicle is to be shut down.

It will be appreciated that there are several practical applications of device 10 and fuel cut-off system 60. For example, device 10 may be used as an auto theft deterrent. For this application, device 10 will require an auto identification device or some other device to receive information within the vehicle itself. In the preferred embodiment, actuation information corresponding to the predetermined actuation information, such as vehicle identification information, stored in storage memory/counter 16 may be transmitted to a card or other article to be kept by the operator/owner of the vehicle in the form of a bar code or other coded means.

Upon entering the vehicle, and in order to start the vehicle, the operator must insert the card into bar code scanner 32. Bar code scanner 32 reads the coded information and transmits it to device 10. Device 10 then processes the actuation information received from the card to determine if it corresponds to the information previously stored. If such a correspondence exists, device 10 selectively actuates switch 12 as discussed hereinabove and opens the fuel line, preferably at fuel pump circuit 64, so that the operator may start engine 62 of the vehicle.

The actuation information on the card received by bar code scanner 32 can also include the time at which the vehicle may be used, i.e., an actuation time. Therefore, in the context of a rental car company, the company can program when or for how long the rental car may be used. This information is processed by device 10 which, in turn, actuates switch 12 accordingly.

With respect to applications which use receiver 36 to receive information from remote station 38 via satellite or microwave transmissions, it will be appreciated that any law enforcement agency or employer may have access to vehicles equipped with device 10. Thus, use of the vehicles can be regulated. Such regulation may be beneficial where persons are only permitted to operate vehicles at certain times of the day or on certain days of the week. Instructions regarding use of the vehicle could be entered at remote station 38 and transmitted to device 10 into the vehicle, thereby preventing illegal use of the vehicle.

While a full and complete description of the invention has been set forth in accordance with the dictates of the Patent Statutes, it should be understood that modifications can be resorted to without departing from the spirit hereof or the scope of the appended claims. Thus, it is noted that the device of the present invention as described herein may be of any size or dimension in accordance with the general description given hereinabove.

Furthermore, it should be understood that the selection of specific component elements of the present invention can be determined without departing from the spirit of the invention herein described, and any device having the functional elements described in the appended claims will suffice.

What is claimed is:

1. A device for controlling the flow of fuel to an engine in a vehicle, comprising:
   a) a fuel switch for selectively opening and closing the flow of fuel to the engine;
   b) a clock for storing instantaneous time;
   c) means for receiving actuation time from a source external to the vehicle; and,
   d) processor means for comparing said instantaneous time and said actuation time and selectively actuating said switch means upon a correspondence therebetween.

2. A fuel cut-off system including a fuel switch to cut off the flow of fuel to an engine in a vehicle and a device for selectively actuating the fuel switch, said device comprising:
   a) a clock for storing instantaneous time;
   b) means for receiving an actuation time from a source external to the vehicle; and,
   c) processor means for comparing said instantaneous time and said actuation time and generating a signal to the fuel switch when a correspondence between said instantaneous time and said actuation time is identified.

3. A method for controlling the flow of fuel to an engine in a vehicle, comprising the steps of:
  i) storing predetermined actuation information;
  ii) receiving from a source external to the vehicle verification actuation information other than a time for actuation;
  iii) identifying whether said verification actuation information corresponds with said predetermined actuation information; and,
  iv) selectively actuating a circuit which controls the flow of fuel to the engine upon the identification of a correspondence, said step of selectively actuating a circuit includes the steps of
    a) determining the current time;
    b) receiving information indicative of a time for actuation from a source external to the vehicle;
    c) identifying when said current time corresponds with said time for actuation; and,
    d) actuating said circuit upon the identification of a correspondence between said current time and said time for actuation.

4. The method of claim 3, wherein said step of actuating said circuit upon identification of a correspondence comprises the steps of:
  a) generating a signal indicative of a correspondence between said current time and said time for actuation; and
  b) actuating said circuit upon said signal.

5. A method for selectively cutting off the flow of fuel to an engine in a vehicle, comprising the steps of:
  a) determining the current time;
  b) receiving from a source external to the vehicle information indicative of a time for actuation;
  c) identifying when said current time corresponds with said time for actuation; and,
  d) selectively actuating said circuit upon the identification of a correspondence between said current time and said time for actuation.

6. The method of claim 5, wherein said step of selectively actuating comprises the steps of:
  a) determining whether the engine is operating;
  b) generating a signal indicative of a correspondence between said current time and said time for actuation upon completion of said step of determining; and
  c) actuating said circuit upon said signal.

* * * * *